United States Patent
Krone et al.

(10) Patent No.: US 6,607,204 B2
(45) Date of Patent: Aug. 19, 2003

(54) SELF-PROPELLED HARVESTING MACHINE, ESPECIALLY A PICK-UP CHOPPER

(75) Inventors: Bernard Krone, Spelle (DE); Karl-Heinz Radke, Wilthen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 09/845,688

(22) Filed: Apr. 30, 2001

(65) Prior Publication Data

US 2001/0052684 A1 Dec. 20, 2001

(30) Foreign Application Priority Data

May 4, 2000 (DE) .......................................... 200 07 795

(51) Int. Cl.[7] ................................................ B60G 3/00
(52) U.S. Cl. ............................... 280/124.11; 280/6.154; 280/124.128
(58) Field of Search .......................... 280/6.154, 6.153, 280/124.109, 124.111, 124.116, 124.128, 124.13, 124.148, 124.145; 296/16

(56) References Cited

U.S. PATENT DOCUMENTS

| | | | | |
|---|---|---|---|---|
| 3,414,290 A | * | 12/1968 | Wilfert et al. | 280/124.111 |
| 4,018,296 A | * | 4/1977 | Knudson | 180/41 |
| 4,152,004 A | * | 5/1979 | Schroder | 267/64.11 |
| 5,769,502 A | * | 6/1998 | Bettini | 280/6.154 |
| 5,813,697 A | * | 9/1998 | Bargenquast et al. | 280/6.154 |
| 5,921,338 A | * | 7/1999 | Edmondson | 180/6.5 |
| 5,924,711 A | * | 7/1999 | Schote | 280/124.111 |
| 5,971,413 A | * | 10/1999 | El-Kassouf | 180/360 |
| 5,971,493 A | * | 10/1999 | Robert | 280/6.154 |
| 5,997,013 A | * | 12/1999 | Claxton | 280/6.154 |
| 6,158,539 A | * | 12/2000 | Isley | 180/89.14 |
| 6,279,931 B1 | * | 8/2001 | Kopczynski | 280/124.111 |
| 6,322,090 B1 | * | 11/2001 | Chignoli et al. | 280/124.116 |

FOREIGN PATENT DOCUMENTS

| | | | |
|---|---|---|---|
| DE | 2237106 | 2/1974 | |
| DE | 104902 | 4/1974 | |
| DE | 1755070 | 12/1975 | |
| DE | 3346309 | 7/1984 | |
| DE | 3418721 | 11/1985 | |
| DE | 3834693 | 6/1989 | |
| JP | 5262818 | * 5/1977 | 280/6.154 |

OTHER PUBLICATIONS

Weigelt, Horst–Front Axle Spring Suspension for Agricultural Tractors In: Grundl. Landtechnik, Bd. 36, 1986, Nr. 2, S.54–59 (with English translation).

* cited by examiner

Primary Examiner—Paul N. Dickson
Assistant Examiner—Toan C To
(74) Attorney, Agent, or Firm—Jordan and Hamburg LLP

(57) ABSTRACT

A self-propelled harvesting machine, especially a pick-up chopper, for picking up and chopping harvested material, such as corn, green crops, etc., including a machine frame, a horizontally situated floating axle arranged parallel to a direction of travel of the machine, and a rear axle constructed as a steerable, rigid axle and supported on the machine frame so that it can be swivelled about the floating axle. The rear axle includes an axle body supported with shock absorption on the machine frame so that it can move up and down relative to the machine frame. The machine also includes a swiveling axle arranged parallel to the floating axle, a transverse swinging fork overlapping the axle body and hinged to the machine frame about the swiveling axle with the axle body being mounted on the transverse swinging fork, a spring element and a damping element. The transverse swinging fork is supported at a free end on the machine frame by the spring element and the damping element.

33 Claims, 4 Drawing Sheets

SELF-PROPELLED HARVESTING MACHINE, ESPECIALLY A PICK-UP CHOPPER

BACKGROUND OF THE INVENTION

Figure 1:
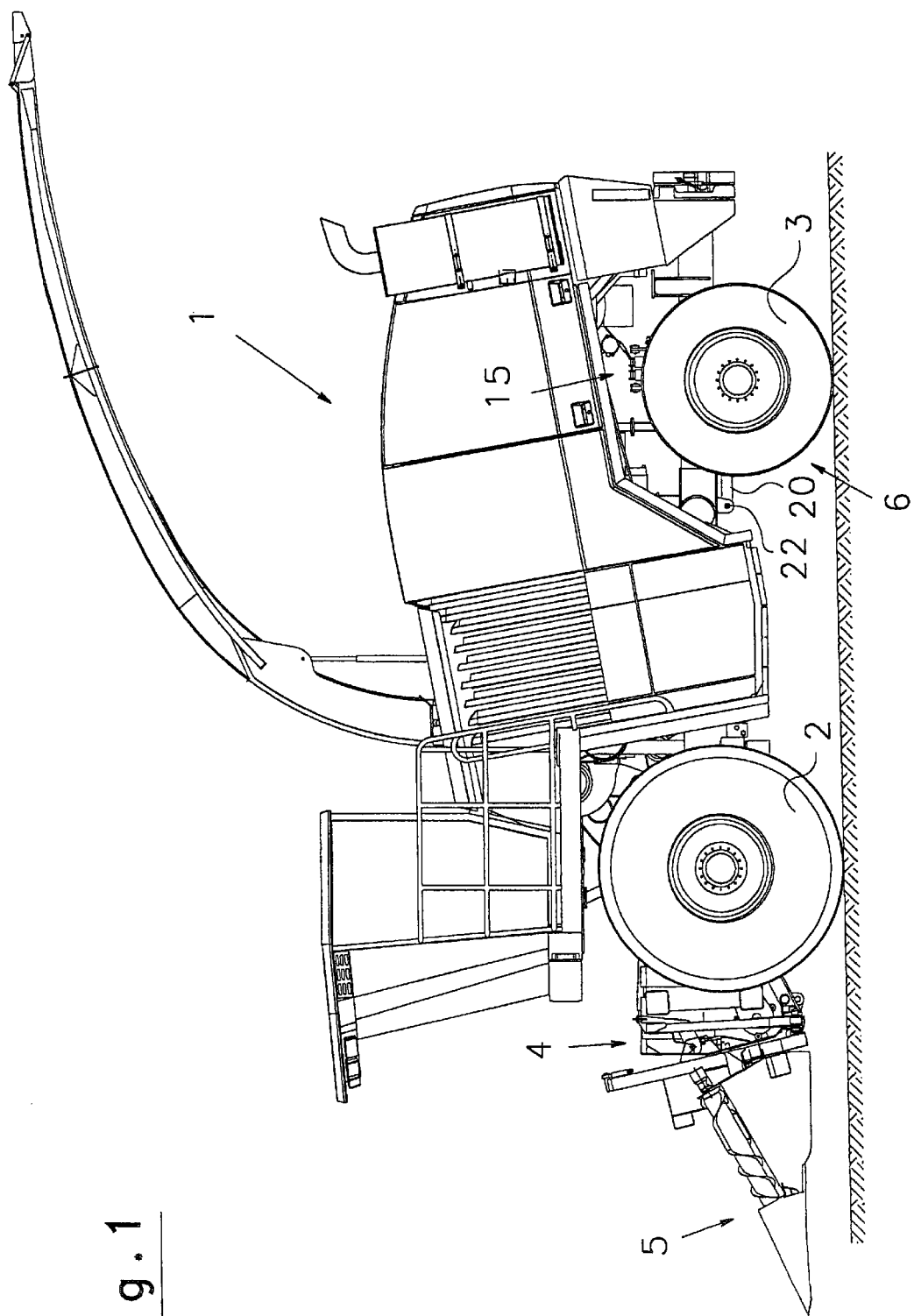

The invention relates to a self-propelled harvesting machine, especially to a self-propelled pick-up chopper for picking up and chopping harvested material, such as corn, green crops, etc.

The invention is concerned with the problem of improving the driving behavior of self-propelled harvesting machines, making higher driving speeds possible for these, even on uneven ground conditions.

SUMMARY OF THE INVENTION

Due to the suspension of the rear axle, in conjunction with its self-aligning support, a significantly improved driving behavior results since, under all conditions, the steering wheels remain in contact with the ground, reactions, resulting from ground unevennesses and interfering with the running of the machine, are largely avoided and higher driving speeds are thus possible, without having a disadvantageous effect on the ground-contacting processes of working implements disposed at the front, such as adapters at the pick-up choppers.

Due to the special support at a transverse swinging fork, overlapping the axle body, the axle support requires only little space. The bracing of the transverse swinging fork by a trailing arm, stressed in tension eccentrically, leaves the center region free for other units. At the same time, advantageous force conditions are achieved.

Further details and effects arise out of the following description and the drawing, in which an example of the object of the invention is illustrated in greater detail.

IN THE DRAWINGS

Figure 2:
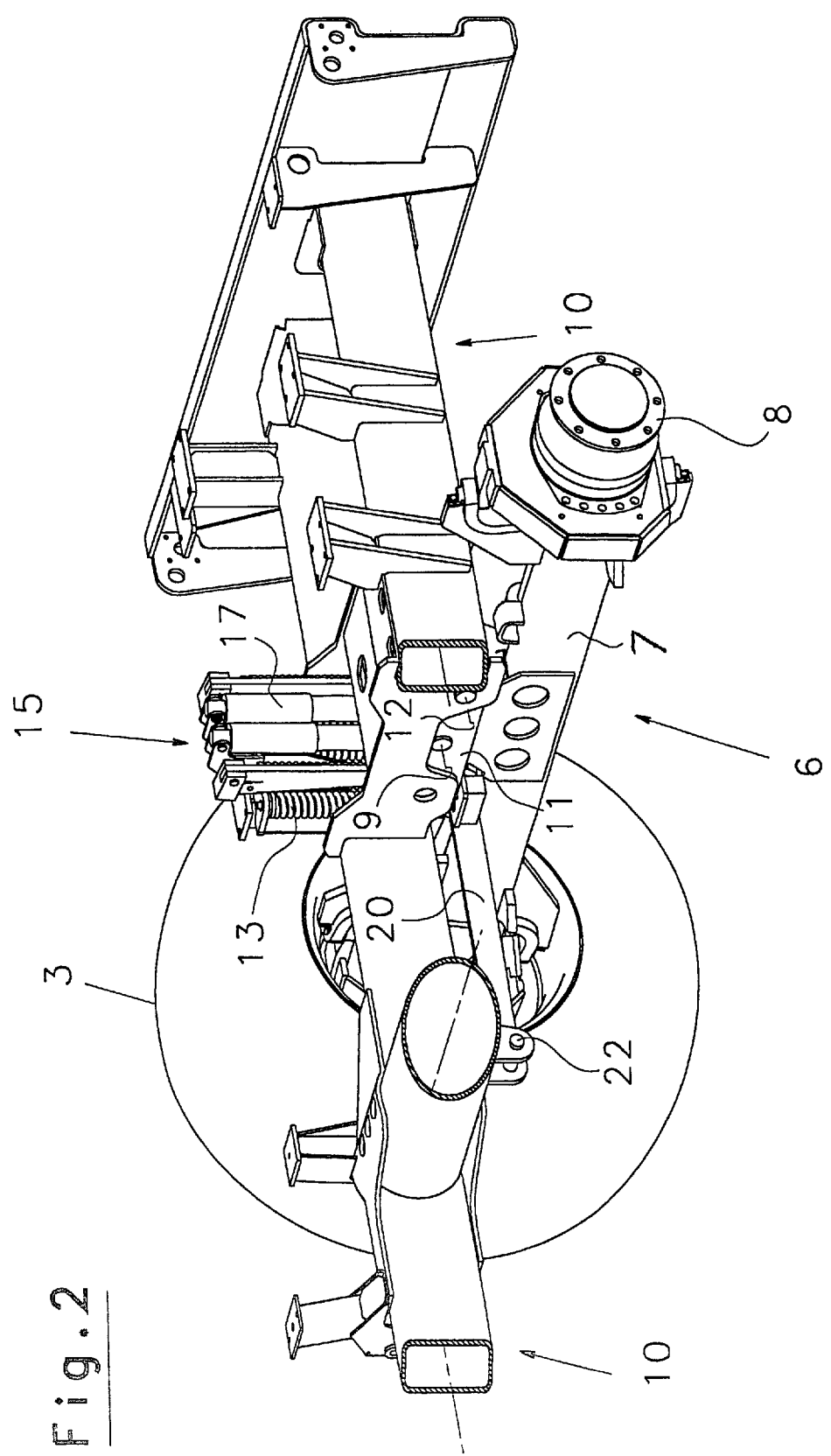
Figure 3:
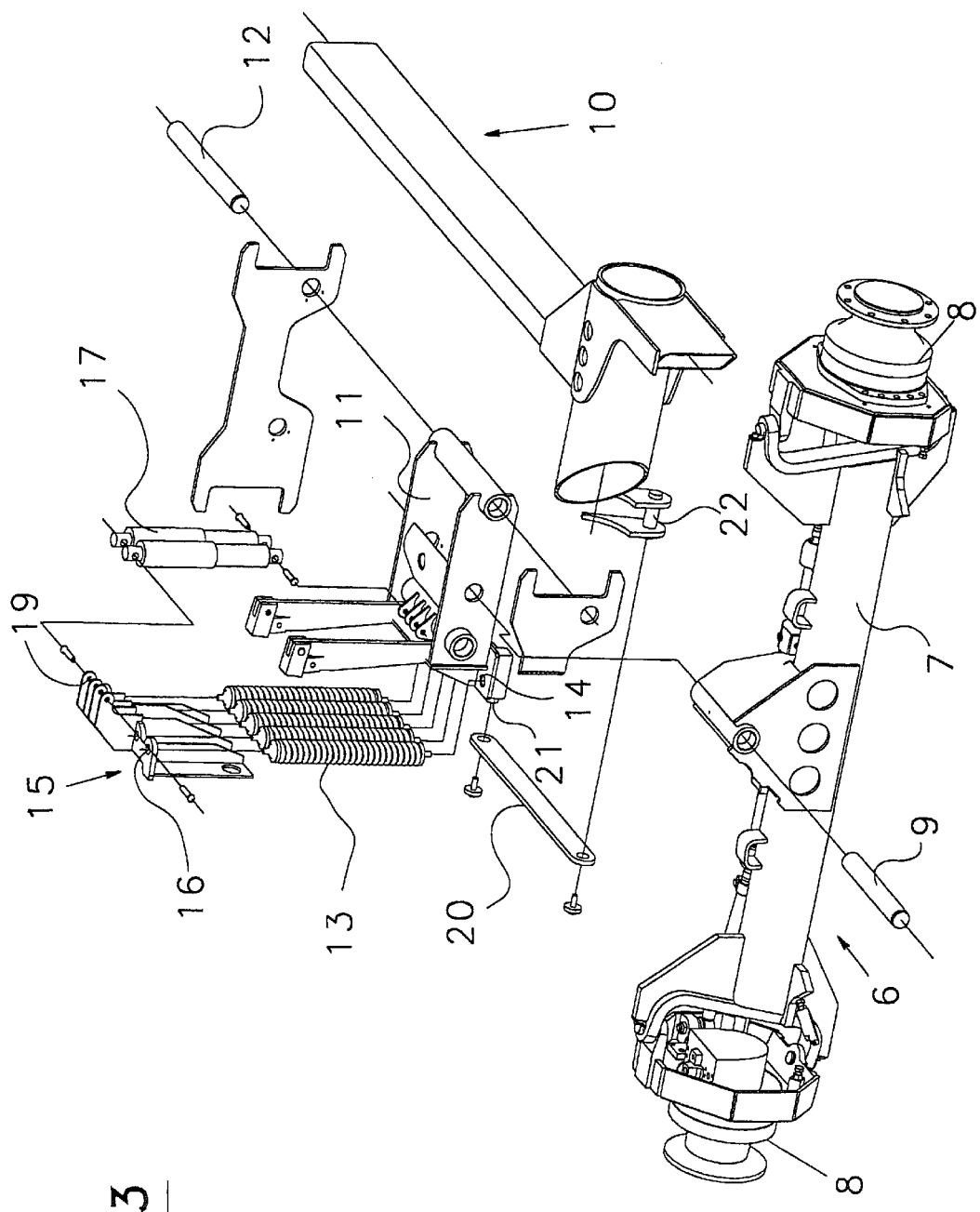
Figure 4:
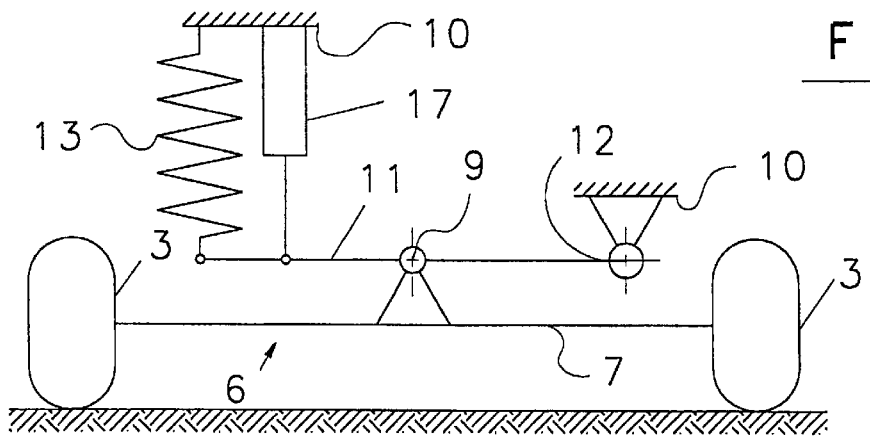
Figure 4:
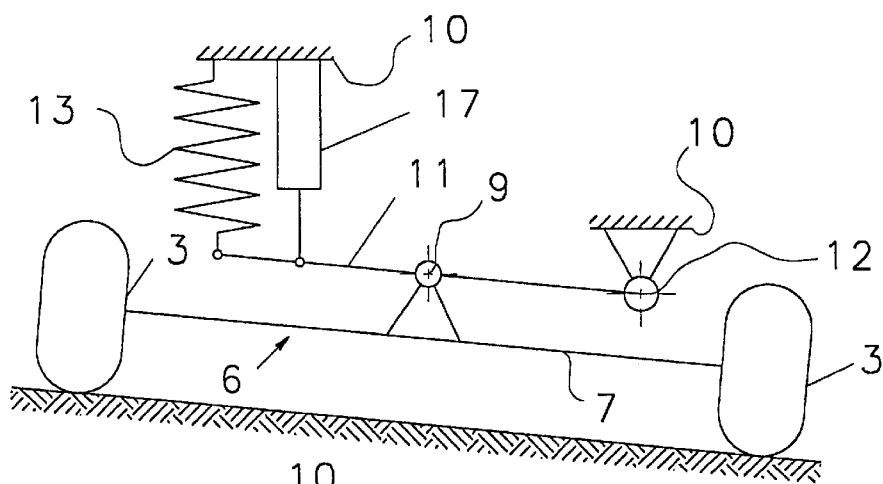
Figure 4:
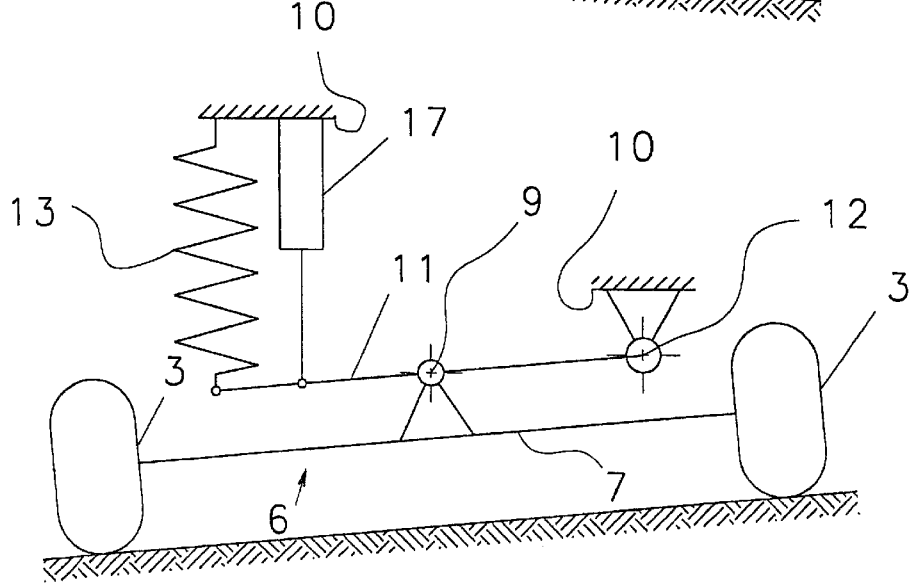

FIG. 1 shows a side view of an inventive harvesting machine, constructed as a pick-up chopper, FIG. 2 shows a perspective, regionally truncated view of a portion of the harvesting machine to illustrate the construction and support of the rear axle, FIG. 3 shows a regionally truncated exploded representation of the machine frame and the rear axle, and FIG. 4 shows diagrammatic representations of the rear axle for different ground conditions.

BACKGROUND OF THE INVENTION

FIG. 1 illustrates a self-propelled pick-up chopper 1 as a self-propelled harvesting machine, which is supported on the ground over running and driving wheels 2 at the front axle and over running steering wheels 3 at the rear axle. A corn dentition 5, for example, is connected to an adapter device 4. Like the adapter device 4, it is supported on the ground during a harvesting operation and can make contact with it. Instead of the self-propelled pick-up chopper 1, a self-propelled combine harvester, a self-propelled potato harvesting machine or a similar machine can also come into consideration for realizing the invention.

The rear axle 6, which is constructed as a steerable rigid axle guiding the rear wheels 3, comprises, as can be seen best in FIGS. 2 and 3, a rigid axle body 7, to which wheel heads 8 for connection to the rear wheels 3 are hinged. The axle body 7 is supported at the machine frame 10 so that it can swivel about a horizontal full floating axle 9, which is parallel to the direction of travel and, accordingly in a plane transversely to the direction of travel of the machine. At the same time, the axle body 7 is supported elastically, so that it can move up and down relative to the machine frame, so that the rear wheels remain in contact with the ground even in the case of larger ground unevennesses.

In particular, the axle body 7 is mounted self-aligning at one of these transverse swinging forks 11, which overlaps the axle body 7 in the operating position and is hinged to the machine frame so that it can swivel about a swiveling axle 12 parallel to the full floating axle 9 of the axle body 7. The transverse swinging fork 11 is supported at the machine frame 10 at its free end by a spring element and a damping element. In the case of the examples shown, the spring element preferably consists of a plurality of, for example, four spiral compression springs 13, which are combined into a spring assembly and engage the transverse swinging fork 11 from the upper side. The point of engagement of the spiral compression spring 13, closest to the viewer in FIG. 3, is labeled 14. At their upper side, the spiral compression springs 13 engage a bracket 15, the point of connection of the spiral compression spring 13, closest to the viewer in FIG. 4, being labeled 16. The bracket 15 is fixed to the machine frame 10, for example, by bolting or welding.

As damping element, a number of hydraulic shock absorbers 17, such as two, is provided, which engage the upper side of the transverse swinging fork 11 in parallel at 18 and are also supported at the bracket 15 at 19.

The trailing arm 20 forms a tension strut which is arranged at a distance from the vertical, longitudinal median plane of the machine frame 10. The longitudinal median plane coincides with the swiveling axle 9. One end of the trailing arm 20 engages the transverse swinging fork 11 at 21 and the other end of the trailing arm 20 is hinged to the machine frame 10 at 22.

The construction of the rear axle saves much space and the rear axle works precisely and, at the same time, is robust. The bracing of the transverse swinging fork 11, which forms a torsion-resistant component, leaves the middle region below the machine frame 10 free for other units and, moreover, is extremely strong.

FIG. 4 diagrammatically illustrates the mode of action of the rear axle 6 and the position of the parts for three different land conditions. The Figures illustrate that contact with the ground is maintained even when there are large height differences between the rear wheels 3, and the work of the springs 13, which absorb an increased pressure in the representation in the middle and a reduced pressure in the representation at the bottom.

What we claim is:

1. A self-propelled harvesting machine for picking up and chopping harvested material, comprising:
   a machine frame;
   a horizontally situated floating axle arranged parallel to a direction of travel of the machine;
   a rear axle constructed as a steerable, rigid axle and supported on said machine frame, said rear axle being swivelable about said floating axle, said rear axle including an axle body supported with shock absorption on said machine frame, said axle body being movable relative to said machine frame:
   a swiveling axle arranged parallel to said floating axle;
   a transverse swinging fork overlapping said axle body and hinged to said machine frame about said swiveling axle, said axle body being mounted on said transverse swinging fork;

a spring element; and a damping element, said transverse swinging fork being supported at a free end on said machine frame by said spring element and said damping element.

2. The machine of claim 1, wherein said spring element comprises a plurality of spiral compression springs arranged in parallel to thereby form a spring assembly, said springs engaging an upper side of said transverse swinging fork.

3. The machine of claim 2, wherein said damping element comprises a plurality of hydraulic shock absorbers arranged parallel to one another and to said spiral compression springs.

4. The machine of claim 1, wherein said damping element comprises a plurality of hydraulic shock absorbers arranged parallel to one another and to said spring element.

5. The machine of claim 1, further comprising a trailing arm arranged in front of said transverse swinging fork in the direction of travel of the machine, a rear end of said trailing arm engaging a free end of said transverse swinging fork and a front end of said trailing arm being hinged to said machine frame.

6. The machine of claim 5, wherein said trailing arm is located at a distance from a vertical, longitudinal, median plane of said machine frame.

7. A harvesting machine, comprising:

a machine frame;

a rear axle having an axle body;

a full floating axle for supporting said rear axle on said machine frame such that said rear axle is rotatable about said floating axle relative to said machine frame;

a shock absorption mechanism for supporting said rear axle on said machine frame such that said rear axle is movable relative to said machine frame; and a transverse swinging fork having a first side and a second, free side opposite to said first side, said transverse swinging fork being hingedly connected on said first side to said machine frame, said shock absorption mechanism being connected to said second side of said transverse swinging fork, said shock absorption mechanism comprising at least one spring element and at least one damping element.

8. The machine of claim 7, further comprising a mechanism for picking up and chopping material.

9. The machine of claim 7, wherein said rear axle is a steerable, rigid axle.

10. The machine of claim 7, wherein said floating axle is arranged parallel to a direction of travel of the machine.

11. The machine of claim 7, wherein said rear axle further comprises wheel heads connected to ends of said axle body for enabling wheels to be mounted on said rear axle.

12. The machine of claim 7, wherein said floating axle is mounted on said transverse swinging fork.

13. The machine of claim 7, wherein said at least one spring element comprises a plurality of spiral compression springs arranged parallel to one another and in engagement with an upper side of said transverse swinging fork.

14. The machine of claim 7, wherein said at least one damping element comprises a plurality of hydraulic shock absorbers arranged parallel to one another and to said at least one spring element.

15. The machine of claim 7, further comprising a swiveling axle for connecting said transverse swinging fork to said machine frame such that said transverse swinging fork is pivotable relative to said machine frame.

16. The machine of claim 15, wherein said swiveling axle defines an axis substantially parallel to an axis defined by said floating axle.

17. The machine of claim 7, where said axle body is mounted self-aligning at said transverse swinging fork.

18. The machine of claim 7, wherein said transverse swinging fork is arranged above said axle body.

19. The machine of claim 7, further comprising an elongate trailing arm having a first end and a second end opposite to said first end, said elongate trailing arm being arranged in front of said transverse swinging fork in a direction of travel of the machine and connected at said first end to said second side of said transverse swinging fork and hingedly connected at said second end to said machine frame.

20. The machine of claim 19, wherein said trailing arm is located at a distance from a vertical, longitudinal, median plane of said machine frame.

21. A harvesting machine, comprising:

a machine frame;

a rear axle having an axle body;

support means for supporting said rear axle on said machine frame such that said rear axle is rotatable about said support means relative to said machine frame;

shock absorption means for supporting said rear axle on said machine frame such that said rear axle is movable relative to said machine frame; and a transverse swinging fork having a first side and a second side opposite to said first side, said transverse swinging fork being hingedly connected on said first side to said machine frame, said shock absorption means being connected to said second side of said transverse swinging fork, said shock absorption means comprising at least one spring element and at least one damping element.

22. The machine of claim 21, wherein said support means comprise a full floating axle arranged parallel to a direction of travel of the machine.

23. The machine of claim 21, wherein said support means is mounted on said transverse swinging fork.

24. The machine of claim 21, wherein said at least one spring element comprises a plurality of spiral compression springs arranged parallel to one another and in engagement with an upper side of said transverse swinging fork.

25. The machine of claim 21, wherein said at least one damping element comprises a plurality of hydraulic shock absorbers arranged parallel to one another and to said at least one spring element.

26. The machine of claim 21, further comprising a swiveling axle for connecting said transverse swinging fork to said machine frame such that said transverse swinging fork is pivotable relative to said machine frame.

27. The machine of claim 26, wherein said support means comprise a full floating axle and said swiveling axle defines an axis substantially parallel to an axis defined by said floating axle.

28. The machine of claim 21, further comprising an elongate trailing arm having a first end and a second end opposite to said first end, said elongate trailing arm being arranged in front of said transverse swinging fork in a direction of travel of the machine and connected at said first end to said second side of said transverse swinging fork and hingedly connected at said second end to said machine frame.

29. The machine of claim 28, wherein said trailing arm is located at a distance from a vertical, longitudinal, median plane of said machine frame.

30. A harvesting machine, comprising:

a machine frame;

a rear axle having an axle body;

a floating axle for supporting said rear axle on said machine frame such that said rear axle is rotatable about said floating axle relative to said machine frame;

a shock absorption mechanism for supporting said rear axle on said machine frame such that said rear axle is movable relative to said machine frame;

a transverse swinging fork having a first side and a second side opposite to said first side, said transverse swinging fork being hingedly connected on said first side to said machine frame, said shock absorption mechanism being connected to said second side of said transverse swinging fork; and an elongate trailing arm having a first end and a second end opposite to said first end, said elongate trailing arm being arranged in front of said transverse swinging fork in a direction of travel of the machine and connected at said first end to said second side of said transverse swinging fork and hingedly connected at said second end to said machine frame.

31. The machine of claim 30, wherein said trailing arm is located at a distance from a vertical, longitudinal, median plane of said machine frame.

32. A harvesting machine, comprising:

a machine frame;

a rear axle having an axle body;

support means for supporting said rear axle on said machine frame such that said rear axle is rotatable about said support means relative to said machine frame;

shock absorption means for supporting said rear axle on said machine frame such that said rear axle is movable relative to said machine frame; and a transverse swinging fork having a first side and a second side opposite to said first side, said transverse swinging fork being hingedly connected on said first side to said machine frame, said shock absorption means being connected to said second side of said transverse swinging fork; and an elongate trailing arm having a first end and a second end opposite to said first end, said elongate trailing arm being arranged in front of said transverse swinging fork in a direction of travel of the machine and connected at said first end to said second side of said transverse swinging fork and hingedly connected at said second end to said machine frame.

33. The machine of claim 32, wherein said trailing arm is located at a distance from a vertical, longitudinal, median plane of said machine frame.

* * * * *